Figure 1:
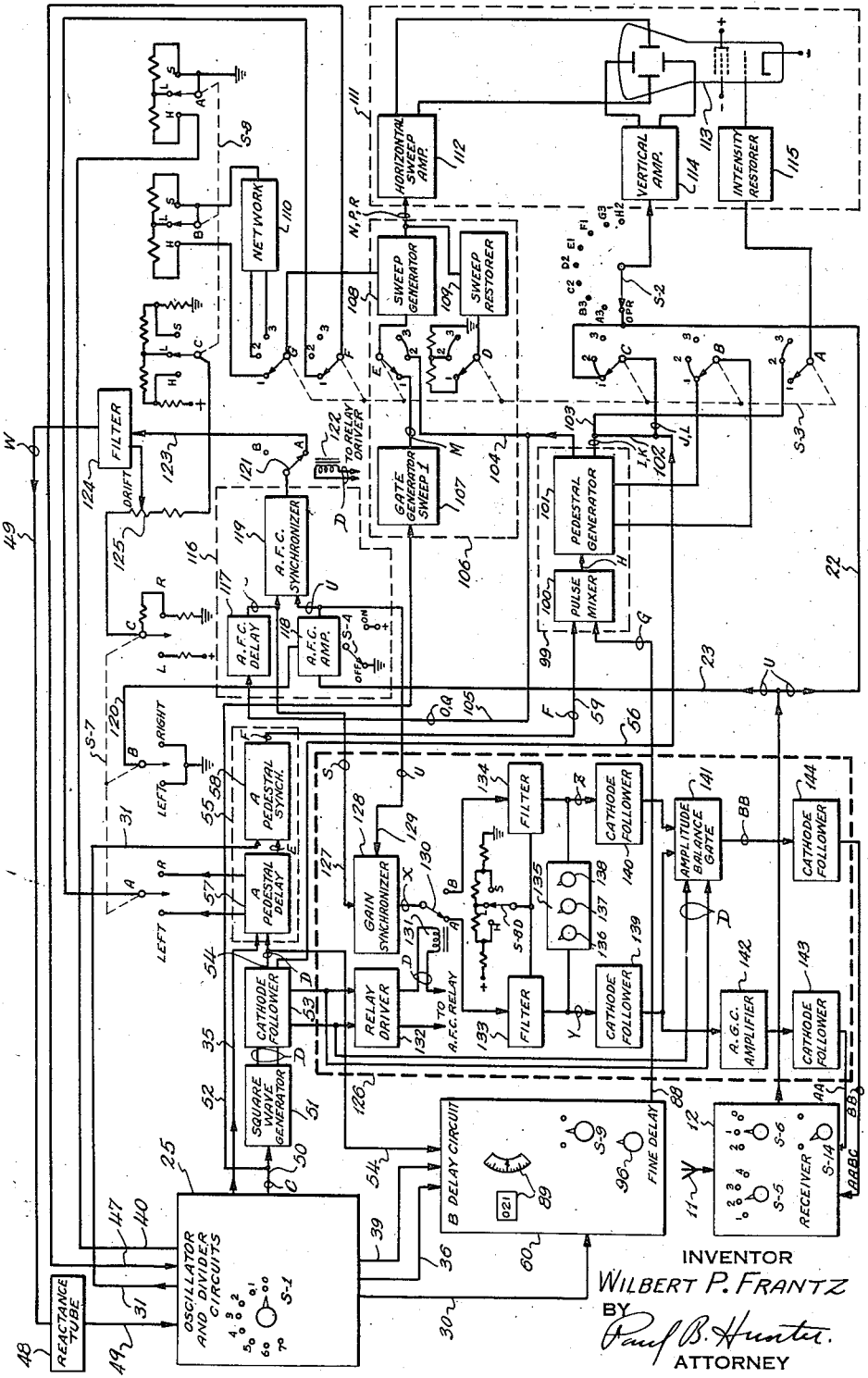

SLOW SWEEP SPEED

MEDIUM SWEEP SPEED

FAST SWEEP SPEED

INVENTOR
WILBERT P. FRANTZ
BY
Paul B. Hunter
ATTORNEY

Sept. 1, 1953  W. P. FRANTZ  2,651,033
AUTOMATIC AMPLITUDE BALANCING CIRCUITS
Filed Jan. 21, 1952  5 Sheets-Sheet 4
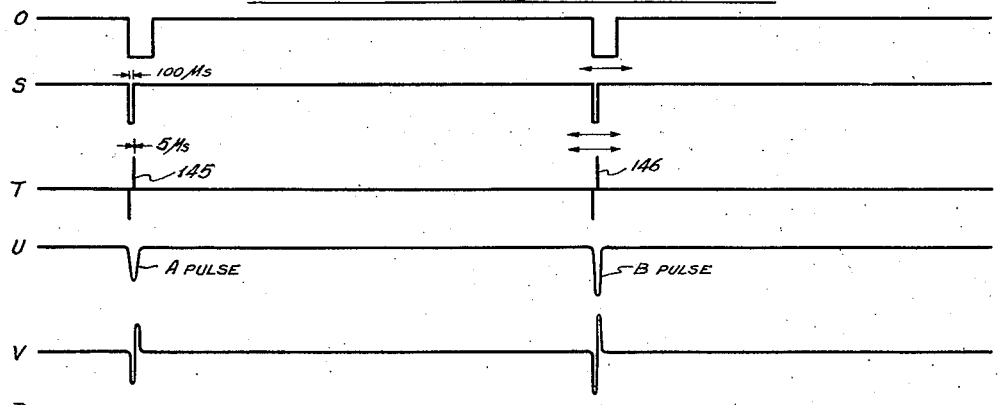
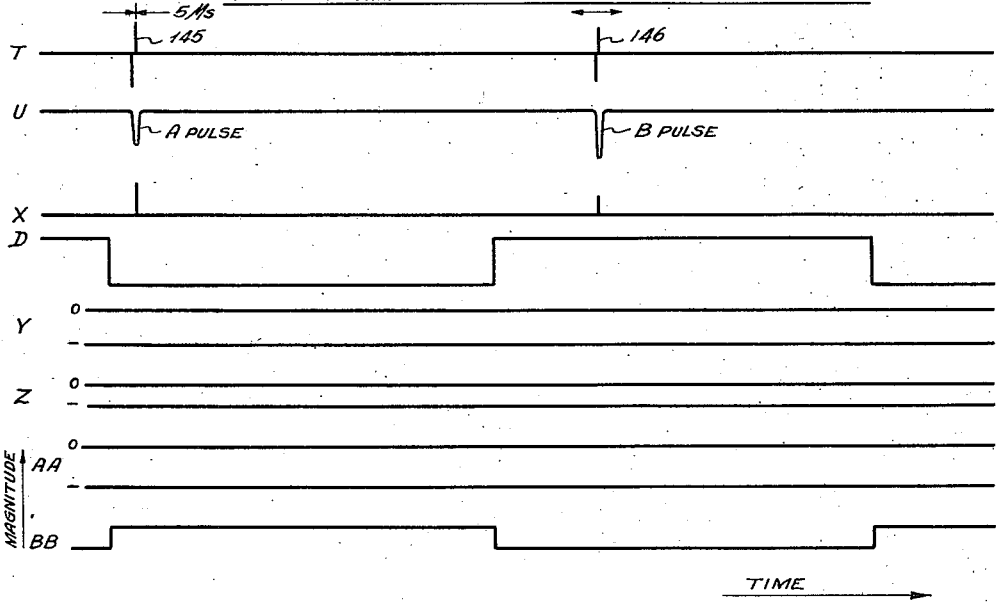
Fig. 4.
INVENTOR
WILBERT P. FRANTZ
BY
ATTORNEY Sept. 1, 1953 W. P. FRANTZ 2,651,033
AUTOMATIC AMPLITUDE BALANCING CIRCUITS
Filed Jan. 21, 1952 5 Sheets-Sheet 5

INVENTOR
WILBERT P. FRANTZ
BY
*Paul B. Hunter*
ATTORNEY

Patented Sept. 1, 1953

2,651,033

UNITED STATES PATENT OFFICE 2,651,033

AUTOMATIC AMPLITUDE BALANCING CIRCUITS

Wilbert P. Frantz, Glen Head, N. Y., assignor to The Sperry Corporation, a corporation of Delaware Application January 21, 1952, Serial No. 267,441

9 Claims. (Cl. 343—103)

This invention relates to automatic amplitude balancing circuits and especially to automatic pulse amplitude balancing circuits useable in hyperbolic navigation receivers.

In a hyderbolic navigation system a pair of spaced ground stations transmit radio signals synchronously in all directions. These signals travel through space with the velocity of light, arriving at a remote receiving station after an elapsed time interval equal to the distance between the ground station and the receiving station divided by the velocity of light. At the receiving station the difference in time between the arrival of a first signal from one of the ground stations and the arrival of the signal from the other ground station is accurately measured. The locus of all points in space at which the time difference interval between arrivals of signals from the spaced ground stations are equal form an imaginary curve expressed mathematically as a spherical hyperbola wherein the foci of the hyperbola are the two spaced ground stations. For each different time difference interval between the arrivals of the signals from the two spaced ground stations, there exists a different hyperbola. Over the surface of the earth these different hyperbolas form a family of accurately established lines of position. From other pairs of spaced ground stations at different locations, additional families of hyperbolic lines of position are established. The intersection of a specific hyperbolic line of position from one pair of stations with a specific hyperbolic line of position from another pair of statoins establishes a navigational fix.

One well known hyperbolic navigation system is the Loran system. In the Loran system one ground station, known as the master, transmits periodic "A" pulses of accurately established recurrence intervals, for example 25 pulses per second. The second ground station, known as the slave, transmits periodic "B" pulses of the same recurrence interval as the master pulses but delayed in time. The duration of the transmitted A and B pulses is approximately 40 microseconds. The B pulses transmitted from the slave are accurately delayed in time from the A pulses transmitted from the master by an amount equal to the radio travel time from the master to the slave, plus one-half the recurrence interval of the pulses, plus a fixed time delay known as the coding delay. Thus, the time interval from the pulsing of the master to the pulsing of the slave is always greater than one-half the pulse recurrence interval. This pulsing sequence provides a positive identification between received Loran A and B pulses.

The time difference between the arrival of A and B pulses at a point in space is measured by a receiving apparatus equipped with a cathode-ray indicator and precision timing circuits. Slow, medium and fast sweep-speed voltages are produced from the timing circuits and applied to the horizontal deflection plates to sweep the cathode-ray beam of the indicator in synchronism with the received A and B pulses. A trace separation voltage is applied to the vertical deflection plates of the cathode-ray indicator along with the received Loran pulses to provide an upper trace upon which appears the received A pulses and a lower trace upon which appears the received B pulses. First and second pedestal pulses are provided which appear on the face of the indicator during the slow sweep-speed condition. The first or A pedestal appears stationary on the upper trace at a fixed time and position after the start of the sweep near the left-hand edge of the trace. Adjustable precision time delay circuits control the position of the second or B pedestal, which appears on the lower trace, by accurately indicated time delay intervals delayed from the start of the A pedestal. During the slow sweep-speed condition, the repetition frequency of the timing circuits is altered by a small amount relative to the repetition frequency of the Loran pulses to allow a drift of the received Loran pulses as viewed on the face of the indicator, in order to position the Loran A pulse atop of the A pedestal. Thereafter, the repetition frequency of the timing circuit is automatically maintained in synchronism with the Loran pulses by automatic synchronizing circuits, thereby holding the A pulse atop of the A pedestal. The adjustable B pedestal is positioned by the precision time delay circuits along the lower trace so as to elevate the Loran B pulse atop of the B pedestal. The receiving apparatus measures the time difference interval between the A pulse on the upper or A pedestal and the B pulse on the lower or B pedestal by aligning the B pulse such that it is located at an identical position relative to the start of the B pedestal as the position of the A pulse relative to the start of the A pedestal and then measuring the time interval between the start of the A pedestal and the start of the B pedestal. The measured time delay interval is read directly from a counter mechanically coupled to phase delaying devices in the precision time delay circuits.

The correct alignment or matching of the A and B pulses is facilitated by medium and fast sweep-speed voltages in the following manner. A medium sweep-speed voltage is derived from the A and B pedestals and initiates the upper trace coincident with the start of the A pedestal and initiates the lower trace coincident with the start of the B pedestal, the time duration of the sweeps being identical to the time duration of the pedestals. The A and B pulses on their respective traces are magnified in width and can be aligned accurately one above the other. The A pulse remains in its stationary position on the upper trace as before while the B pulse now can be shifted to the right or left by advancing or delaying the starting time of the sweep voltage under the control of the precision time delay circuits. To facilitate a more precise alignment or match of the A and B pulses, a fast sweep-speed voltage is produced in the same manner as above and the trace separation voltage is removed from the cathode-ray indicator thereby bringing together the expanded A and B pulses onto a single trace. The B pulse now is shifted under the control of the precision time delay circuits so as to appear directly coincident with the A pulse to form a perfect match of the leading edges of the two pulses. Since the received Loran pulses from the nearer Loran station are the stronger, in forming a perfect match it is necessary that the A and B pulses be made to have the same amplitude and an amplitude balancing circuit is provided for this purpose. The precise time delay interval between the A and B pulses is read directly from the counter in the precision time delay circuits. A comprehensive treatment of the Loran system may be found in the book Loran edited by Pierce, McKenzie, and Woodward and published by the McGraw-Hill Book Co., 1948.

The services of a trained operator are required to manipulate the numerous controls of a Loran navigation receiver-indicator to obtain useful navigational information. The accuracy of the information obtained is dependent upon both the skill and speed of the operator in matching the A and B pulses to obtain a Loran reading. Accordingly, the accuracy of Loran readings is improved by simplifying and reducing the manual adjustments necessary to match the received A and B pulses and by providing automatic controls whenever possible. Heretofore the operator in making the final precise match of the expanded A and B pulses on the face of the Loran indicator manipulated a manual amplitude balance control to maintain the amplitude of the A and B pulses of equal value, a manual gain control to set the Loran pulses at a suitable constant peak value, and a manual time delay control to maintain the leading edges of the A and B pulses precisely coincident. The present invention provides a system of amplitude balance and gain control which is accomplished automatically thereby relieving the operator of two manual operations and affording an improvement in the ease of operation of the receiver-indicator as well as an increase in the accuracy of the measured time difference intervals.

In accordance with this invention there is introduced an automatic amplitude balance control circuit responsive to the amplitudes of first and second voltage waves and producing a controlling action to maintain the amplitudes of the voltage waves equal in value.

It is an important object of this invention to provide a simplified apparatus for automatically maintaining the amplitude of one voltage wave equal in value to the amplitude of a corresponding voltage wave.

A more specific object of the invention is to provide in a hyperbolic navigation receiver simplified apparatus for automatically maintaining the amplitudes of the output master and slave pulses of equal value.

Another object of the invention is to provide in a hyperbolic navigation receiver simplified apparatus for automatically maintaining the amplitudes of the output master and slave pulses at a selected constant value.

Yet another object of the invention is to provide an improved hyperbolic navigation receiver with a minimum of manual controls to thereby reduce the time necessary for a navigator to obtain a navigational fix.

Figure 2:
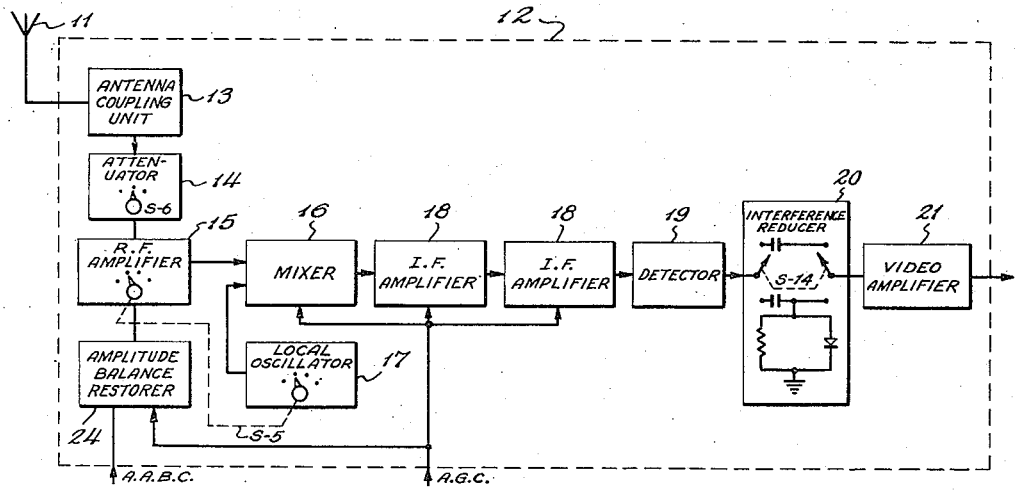
Figure 6A:
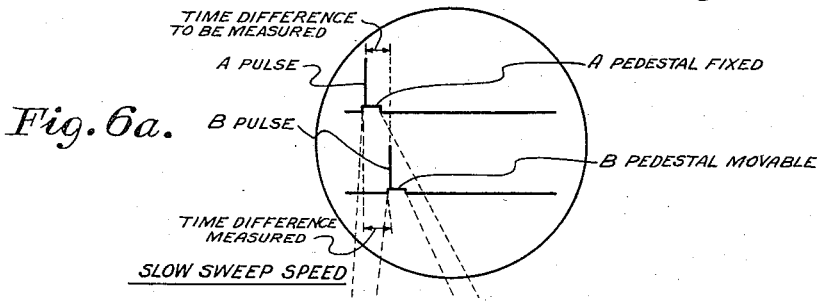
Figure 6B:
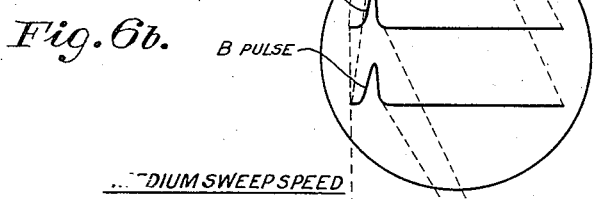
Figure 6C:
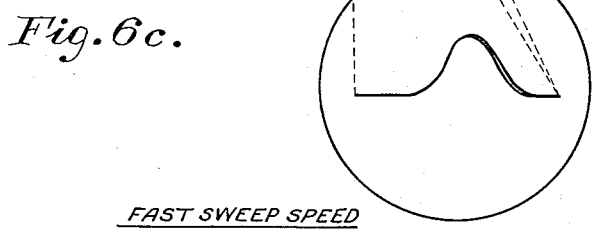
Figure 3:
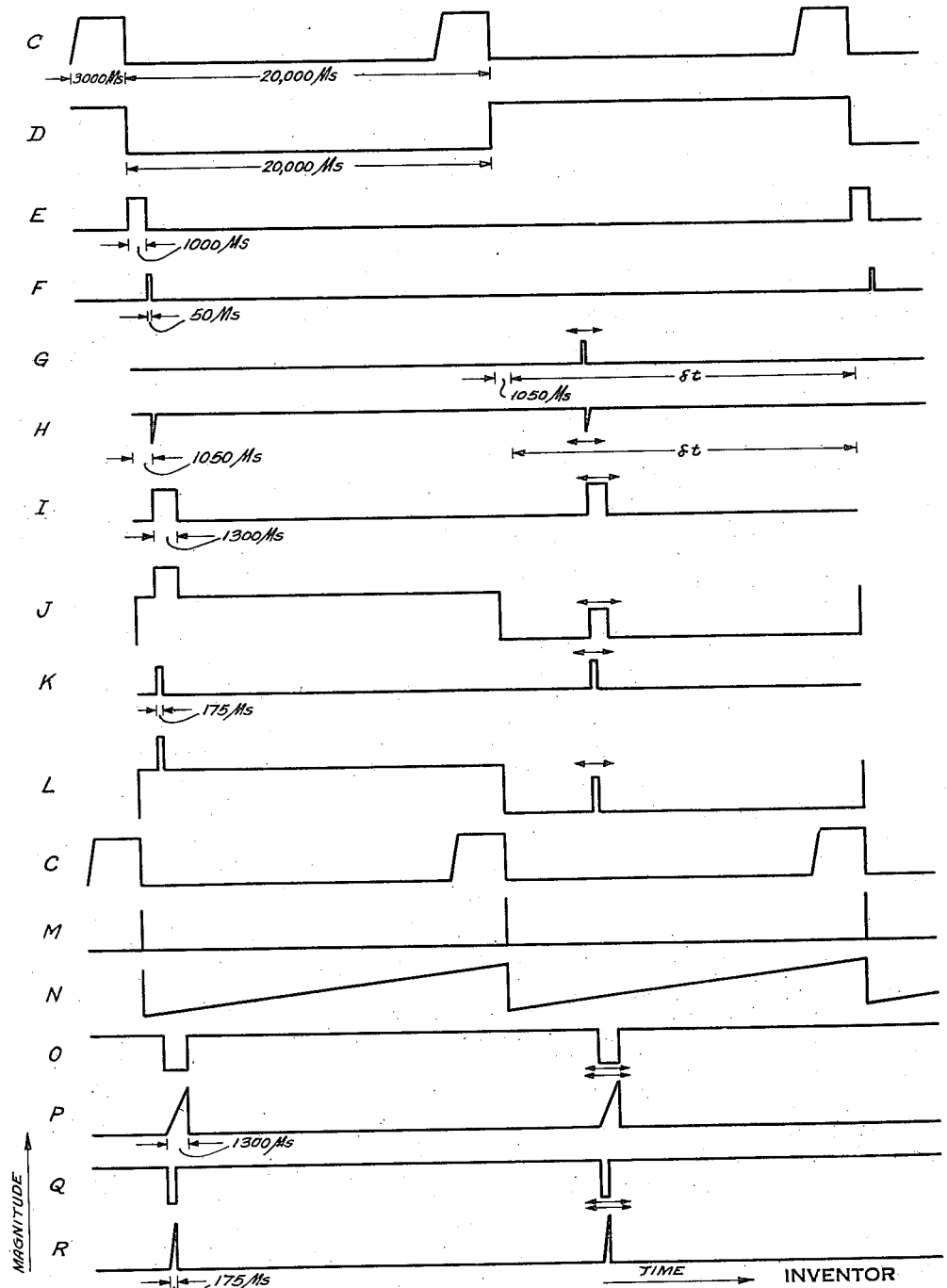
Figure 5:
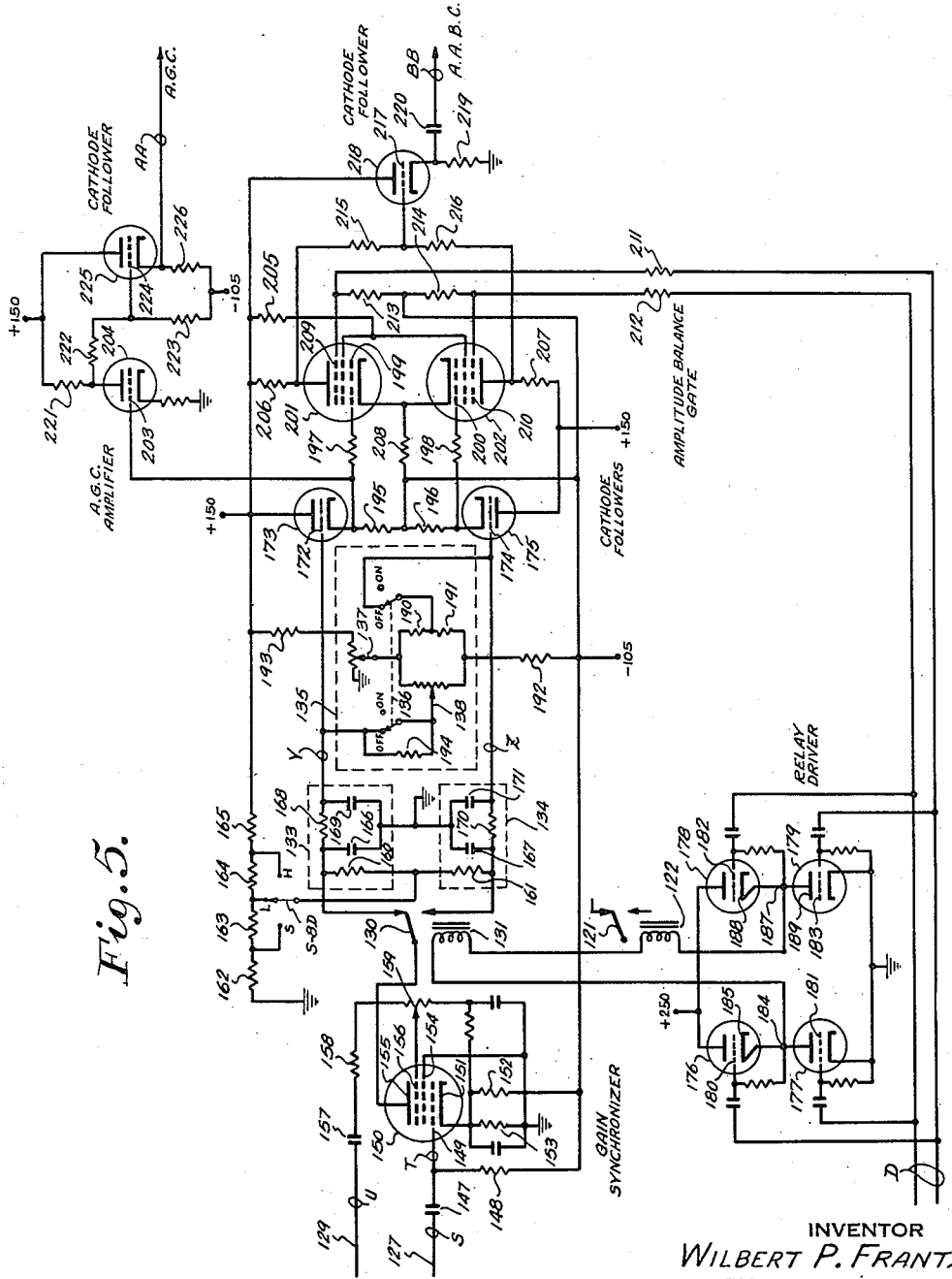

The above brief description and objects of the present invention will be more fully understood and further objects and advantages will become apparent from a careful study of the following detailed description in connection with the drawings, wherein, Fig. 1 is a block diagram of a Loran receiver-indicator illustrating the automatic amplitude balance of this invention, Fig. 2 is a detailed block diagram of the receiver of Fig. 1, Fig. 3 shows the waveforms of voltages associated with the Loran receiver-indicator of Fig. 1, Fig. 4 shows the waveforms of voltages associated with the automatic synchronizing circuits and the automatic amplitude balancing circuits of Fig. 1, Fig. 5 is a schematic diagram of the amplitude balancing circuits of the invention, and Figs. 6a, 6b, and 6c are views of the delineations on the face of the cathode-ray indicator showing the alignment of the Loran pulses for three successive sweep speeds.

In the several figures of the drawings, similar reference numerals refer to similar parts. The illustrated waveforms of the voltages or currents associated with the various individual blocks are identified in the block diagrams by capital letters associated with the lead or leads carrying the voltages or currents.

RECEIVER

Referring to Fig. 1, the Loran A and B pulses from remote master and slave stations are collected by antenna 11 and supplied to the input of superheterodyne receiver 12. Referring particularly to the detailed block diagram of receiver 12 in Fig. 2, antenna coupling unit 13 matches the impedance of antenna 11 to a three-position step attenuator 14 providing fixed amounts of attenuation in steps of 0, 20, and 40 decibels respectively. Radio frequency amplifier 15, mixer 16, and local oscillator 17 are in accordance with conventional superheterodyne practice. Channel switch S–5 selects one of four receiving frequencies within the standard Loran band. Conventional I. F. amplifiers 18 and detector 19 amplify and detect the heterodyned Loran pulse signals and supply detected negative A and B pulses to interference reducer 20. Interference reducer 20 is a resistance-capacitance differentiating circuit and when switched into operation by S–14 reduces the effect of certain forms of interference, namely continuous wave radio signals. While introducing a characteristic distortion, the interference reducer does not affect the accuracy of time difference measurement since both A and B pulses are distorted in exactly the same manner. Video amplifier 21 supples positive A and B pulses over lead 22 in Fig. 1 to the operations terminal of test switch S-2 and over lead 23 to the input of the A. F. C. amplifier 118. An automatic gain control voltage is supplied from an A. G. C. circuit, to be described later, to the gain controlling electrodes of the I. F. amplifiers 18 and mixer 16. Amplitude balance restorer 24 supplies an automatic amplitude balancing control voltage to the gain controlling electrode of R. F. amplifier 15. Description of the amplitude balance restorer 24 appears hereinafter in connection with the automatic amplitude balancing circuits.

PRECISION TIMING CIRCUITS

The precision timing circuits comprising the oscillator and divider circuits, the square-wave circuits, the A delay circuits, and the B delay circuits are similar to those described and claimed in application S. N. 633,473 filed December 7, 1945 in the name of Winslow Palmer, entitled "Timing Apparatus" and assigned to the same assignee as the present invention. These circuits are the same as employed in the DBE Loran receiver-indicator shown and described in the aforementioned book Loran on pages 358 through 363.

Oscillator and divider circuits

The conventional oscillator and divider circuits of block 25, Fig. 1, comprise a crystal-controlled oscillator operating at a frequency of 100 kilocycles per second, and a cascade of five frequency dividers, dividing the frequency of the oscillator output voltage in the steps of 5, 4, 5, 5, and 4 respectively, followed by a transient delay circuit. These circuits supply the basic timing voltages of the Loran receiver-indicator. The output voltage from the first frequency divider is supplied over lead 30 to one input of the B delay circuits 60 and over lead 31 to one input of the A pedestal synchronizer 58. The output voltage from the third frequency divider is supplied over lead 35 to one input of the A pedestal delay 57 and over lead 36 to a second input of the B delay circuits. The output voltage from the fourth frequency divider is supplied over lead 39 to a third input of the B delay circuits and the output voltage from the transient delay circuit, illustrated as waveform C of Fig. 3, is coupled over lead 50 to the input of the square-wave circuits and over lead 52 to the sweep circuits 106.

The basic pulse repetition rates used in Loran are 33⅓, 25, and 20 cycles per second and are identified by the letters H, L, and S. These pulse repetition rates are provided in the oscillator-divider circuits 25 by the basic P. R. R. switch S-8A coupled over lead 40 to the fifth frequency divider. This switch S-8A controls the frequency division of the fifth frequency divider to provide a division of 3 for the rate H, 4 for the rate L, and 5 for the rate S. In addition to the three basic pulse repetition rates H, L, or S, seven additional specific pulse repetition rates identified as 0 through 7 are employed in Loran. The specific P. R. R. switch S-1 controls the feedback of pulses from the output of the fifth frequency divider to the inputs of the second and third frequency dividers to provide these specific rates in the oscillator-divider circuits 25.

A reactance tube circuit 48 is coupled to the 100 kilocycle-per-second crystal oscillator and corrects the frequency of this oscillator in response to a negative automatic synchronizing or automatic frequency control voltage supplied over lead 49 from the A. F. C. circuits. A description of these circuits will appear hereinafter.

Square-wave circuits

The positive pulse voltage of waveform C Fig. 3 from the oscillator-divider circuits energizes square-wave generator 51. This generator 51 is the well-known Eccles-Jordan circuit. Differentiating circuits (not shown) at its two inputs differentiate the positive pulses coupled over lead 50 to produce negative trigger pulses from the trailing or "negative going" edges of the positive pulses. These trigger pulses alternately switch the conduction of plate current between tubes of the Eccles-Jordan circuit in the conventional manner to produce a square-wave output voltage from the circuit, illustrated as waveform D of Fig. 3, whose frequency equals one-half the repetition frequency of the trigger pulses. The frequency of this square-wave voltage corresponds to the pulse repetition rate of the Loran signals. The mark and space time intervals of the square-wave voltage are identical and equal to 20,000 microseconds for rate LO. The square-wave voltage is coupled to a push-pull cathode follower 53.

Cathode follower 53 produces push-pull square-wave output voltages, one voltage inverted in phase with respect to the other. One of these square-wave voltages is supplied over lead 54 to the input of the A delay circuits 55 and to the B delay circuits 60. The other square-wave voltage is supplied over lead 56 to the arm of operations switch S-3C. Both of the square-wave voltages are supplied to the amplitude balancing circuit 126 of this invention. The negative portion of the square-wave voltage over lead 54 energizes the A delay circuits 55 and is eventually synchronized so as to be the time interval during which the A pulses from the master station arrive at the receiver-indicator. The positive portion of the square-wave voltage over lead 54 energizes the B delay circuits 60 and is the time interval during which B pulses from the slave station arrive at the receiver-indicator.

A delay circuits

The A delay circuits 55 comprise a pedestal delay 57 and A pedestal synchronizer 58. The A pedestal delay 57 is in Eccles-Jordan circuit with a differentiating circuit (not shown) at each of its two inputs. The square-wave voltage of waveform D on lead 54 is differentiated by one of the differentiating circuits to produce negative trigger pulses coincident with the trailing or "negative going" edges of the square-wave voltage. These negative trigger pulses initiate the A pedestal delay. The voltage on lead 35 from the third frequency divider with a recurrence interval of 1000 microseconds is differentiated by the other differentiating circuit to produce negative trigger pulses of 1000 microseconds recurrence interval coincident with the trailing edges of the voltage. The A pedestal delay 57 is terminated by the first of the 1000 microsecond negative trigger pulses following the initiation of the A pedestal delay. The output from A pedestal delay 57 is a series of positive pulses of 1000 microseconds duration, illustrated as waveform E in Fig. 3, and whose recurrence interval equals the recurrence interval of the square-wave voltage from cathode follower 53.

Both positive and negative pulses from the A pedestal delay are applied to the "left-right"

switch S-7A. The positive pulses are coupled through the "left" position of switch S-7A and through position 1 of switch S-3F to the input of the third frequency divider over lead 47. The function of the positive pulses on lead 47 is to delay the triggering of the third frequency divider by one more of its 200 microsecond input pulses and thus increase the recurrence interval of the output pulses from the fifth divider by 200 microseconds. This increase in recurrence interval eventually results in an increase in the recurrence interval of the sweep voltage applied to the cathode-ray indicator. The sweep recurrence interval when longer than the recurrence interval of the received Loran pulses causes the delineated A and B pulses to drift slowly across the face of the indicator to the left.

Negative pulses from the A pedestal delay 57 are coupled through the "right" position of switch S-7A and through position 1 of switch S-3F to lead 47. The negative pulses on lead 47 coupled to the input of the third frequency divider perform the function of pretriggering this divider by one less of its 200 microsecond pulses and thus reduce the recurrence interval of the output pulses from the fifth divider by 200 microseconds. This reduction in recurrence interval eventually results in a reduction in the recurrence interval of the sweep voltage applied to the cathode-ray indicator. A shorter sweep recurrence interval than the recurrence interval of received Loran pulses causes the delineated A and B pulses to drift slowly across the face of the indicator to the right. When the "left-right" switch S-7A is in its neutral position, there is no feedback of pulses from the A pedestal delay 57 and consequently there is no drift of the delineated A and B pulses, the sweep recurrence interval now being equal to the recurrence interval of the received A and B pulses.

The A pedestal synchronizer 58 is also an Eccles-Jordan circuit with a differentiating circuit (not shown) at each of its two input terminals. The positive pulses from the A pedestal delay 57 are differentiated by one of the differentiating circuits to form negative trigger pulses coincident with the trailing edges of the positive pulses. The negative trigger pulses initiate the A pedestal synchronizer 58. The voltage on lead 31 from the first frequency divider, with a recurrence interval of 50 microseconds, is differentiated by the other differentiating circuit to produce negative trigger pulses of 50 microseconds recurrence intervals coincident with the trailing edges of the voltage. The A pedestal synchronizer 58 is terminated by the first of the 50 microsecond negative trigger pulses following the initiation of the A pedestal synchronizer. The output from the A pedestal synchronizer is a series of positive pulses of approximately 50 microseconds duration, illustrated as waveform F of Fig. 3, and whose recurrence interval equals the recurrence interval of the square-wave voltage on lead 54. The trailing edges of these output pulses are delayed approximately 1050 microseconds from the trailing edges of the square-wave voltage on lead 54 and the timing of the trailing edges of these output pulses, whose delay time is less than one microsecond, is under the accurate control of the 50 microsecond recurrence interval output pulses on lead 31 from the first frequency divider. The recurrent output pulses from A pedestal synchronizer 58 are coupled over lead 59 to the input of pedestal circuits 99.

B delay circuits

The function of the B delay circuits 60 is to produce recurrent variably delayed output pulses of recurrence interval equal to the recurrence interval of the square-wave voltage of waveform D on lead 54 and whose time delay with respect to the recurrent output pulses from the A delay circuits 55 is adjustable by accurately known amounts indicated on a time difference counter 89. The time delay difference between the output pulses from the A delay circuit and the B delay circuit is established with an accuracy better than one microsecond. The recurrent variably delayed output pulses from B delay circuits 60 occur during the time interval that the square-wave voltage on lead 54 is positive. The recurrent output pulses from the A delay circuits occur during the time interval that the square-wave voltage on lead 54 is negative. A fixed time delay exactly equal to one-half the recurrence interval of the square-wave voltage on lead 54 exists between the recurrent pulses from the B delay circuits 60 and the recurrent pulses from the A delay circuits 55 in addition to the variable time delay introduced by the B delay circuits.

The B delay circuits as shown and described in the aforesaid application S. N. 633,473 comprise coarse, medium and fine phase-shifting channels. The rotations of coarse, medium and fine phase-shifting transformers in these channels control the time position of the recurrent output pulses from the B delay circuits on lead 88. These variably delayed recurrent pulses of approximately 30 microseconds duration are illustrated as waveform G of Fig. 3. Three sinusoidal voltages for exciting the three phase-shifting transformers are derived through amplifiers and low-pass filters from the appropriate voltages on the leads 30, 36, and 39 from the frequency dividers in the oscillator-divider circuits 25. The three phase-shifting transformers are coupled through a gear train to time difference counter 89, to a fine delay control knob 96, and to a motor. The motor is energized by coarse delay switch S-9. The gear ratios between each of the three phase-shifting transformers are equal to the ratios of their frequencies and rotation of the gear train under the control of the fine delay knob 96 or the motor produces the same time delay in all three channels. Three phase-shifted sinusoidal voltages from the three phase-shifting transformers are squared and differentiated to yield pulses that terminate three mono-stable or one-shot multivibrator type selector circuits. The first selector is initiated by a positive trigger pulse resulting from the differentiation of the square-wave voltage of waveform D on lead 54. The first selector is terminated, depending on the bias selected by a range extender potentiometer, by the first, second, or third pulse derived from the output of the coarse phase-shifting channel. The time delay provided by the first selector may be varied continuously over the range of approximately 370 to almost 20,000 microseconds under the control of the fine delay knob 96. The time delay so provided, however, is not itself sufficiently accurate for time difference measurements. To obtain the precision required, the selecting process is repeated in two succeeding selectors of greater precision whose output voltages are terminated by output pulses from the medium and fine phase-shifting channels. The second selector is initiated at the termination of the first selector and is terminated by an output pulse from the medium phase-shifting channel. The third selector is initiated at the termination of the second selector and is terminated by an output pulse from the fine phase-shifting channel, having the required precision for accurate time difference measurements. The recurrent variably delayed output pulses of waveform G from the B delay circuits 60 vary in time relative to the leading edges of the square-wave voltage of waveform D on lead 54 smoothly and unambiguously over the range of from 1050 to almost 20,000 microseconds. Moreover, the trailing edges of these variably delayed pulses vary in time relative to the trailing edges of the output pulses from the A pedestal synchronizer 58 on lead 59 smoothly and continuously over the range of exactly 0 to almost 20,000 microseconds plus exactly one-half the recurrence time interval of the received Loran A and B pulses.

PEDESTAL CIRCUITS

The pedestal circuit 99 comprises pulse mixer 100 and pedestal generator 101. The positive recurrent output pulses of waveform F Fig. 3 from the A pedestal synchronizer 58 are supplied over lead 59 to one input of pulse mixer 100. The positive recurrent output pulses of waveform G Fig. 3 from the B delay circuits 60 are supplied over lead 88 to a second input of the pulse mixer 100. The pulse mixer 100 comprises a pair of grounded-grid amplifier stages with a common anode load resistance. Differentiating circuits (not shown) at each of the two inputs to the pulse mixer 100 produce negative trigger pulses from the trailing edges of the respective positive recurrent pulses. The separate negative trigger pulses are combined across the common load resistance of mixer 100 and supplied to pedestal generator 101. The negative trigger pulses from the mixer 100 appear as in waveform H Fig. 3.

Pedestal generator 101, a mono-stable or one-shot multivibrator, is triggered on by each negative trigger pulse from mixer 100 and is terminated automatically by its own action as a mono-stable multivibrator. The pedestal generator is provided with two separate outputs, one supplying positive pedestal pulses and the other negative pedestal pulses. These output pedestal pulses are of 1300 microseconds duration for positions 1 and 2 of operations switch S-3B and of 175 microseconds duration for position 3. The positive pedestal output pulses are supplied over lead 102 to the arm of operations switch S-3C and also over lead 103 to terminals 2 and 3 of S-3A. These positive pedestal pulses appear as waveforms I and K of Fig. 3. The first or "fixed" pedestal pulse is identified as the A pedestal while the second or "variably delayed" pedestal pulse is identified as the B pedestal. The square-wave voltage from cathode follower 53 appearing on lead 56 is combined with the positive pedestal pulses on lead 102. These combined voltages appear as waveforms J and L of Fig. 3. The negative output pedestal pulses are supplied over lead 104 to terminals 2 and 3 of operations switch S-3E and also over lead 105 to the input of the A. F. C. circuits 116. These negative pedestal pulses appear as waveforms O and Q of Fig. 3.

SWEEP CIRCUITS

Sweep circuits 106 comprise a gate generator 107, a sweep generator 108 producing the slow, medium and fast sweep-speed voltages, and a sweep restorer 109. A differentiating circuit (not shown) at the input to the gate generator 107 produces negative pulses from the trailing edges of the recurrent output voltage from the oscillator-divider circuits 25 on lead 52. These negative pulses are amplified and inverted by the gate generator 107, a triode amplifier, and supplied to terminal 1 of operations switch S-3E. The positive pulses at terminal 1 appear as waveform M of Fig. 3. These positive pulses are coupled to the input of the sweep generator 108 when the arm of switch S-3E is in position 1 and result in momentary conduction of the conventional triode sweep generator thereby discharging the sweep condenser in parallel with the output of the triode tube. The sawtooth sweep voltage across the condenser, as shown by waveform N of Fig. 3, is applied to the input of horizontal sweep amplifier 112 of the cathode-ray tube circuits 111. With operations switch S-3 in position 2, the sweep generator 108 receives the recurrent negative pedestal pulses on lead 104 from pedestal generator 101. Sweep generator 108 produces a linear, medium sweep-speed voltage coincident with and for the duration of the recurrent negative pedestal pulses. This sweep voltage is illustrated as waveform P of Fig. 3 and the duration of the sweep voltage is 1300 microseconds. With operations switch S-3 in position 3, sweep generator 108 produces a linear, fast sweep-speed voltage coincident with and for the duration of the recurrent negative pedestal pulses. For this position of switch S-3 the sweep voltage is as illustrated by waveform R in Fig. 3 and is of 175 microseconds duration. Network 110 coupling basic P. R. R. switch S-8B with switch S-3G functions to maintain the amplitudes of the three sweep voltages from sweep generator 108 of constant value for the three basic pulse repetition rates identified as H, L, or S. The sweep restorer 109, a diode D.-C. restorer, is coupled to the input of horizontal sweep amplifier 112 and functions to clamp the lower edges of the three sweep voltages to a reference voltage level. Sweep restorer 109 insures that the cathode-ray trace on the face of the cathode-ray indicator remains centered for each of the three sweep voltages and in addition insures that the horizontal sweep amplifier 112 operates over its linear transfer characteristic for each of the three sweep voltages.

CATHODE-RAY TUBE INDICATOR CIRCUITS

Horizontal sweep amplifier 112, a phase inverter amplifier, supplies push-pull sawtooth sweep voltages to the horizontal deflection plates of cathode-ray tube 113. Vertical amplifier 114, a phase inverter amplifier, receives through the operations position of test switch S-2 the composite voltages comprising the pedestal and square-wave voltages of waveforms J and L of Fig. 3 and the received Loran A and B pulses from receiver 12. The vertical amplifier 114 supplies push-pull composite voltages to the vertical deflection plates of cathode-ray tube 113. Intensity restorer 115, a diode D.-C. restorer, functions to blank the cathode-ray trace on the face of the cathode-ray tube 113 during the time intervals between sweeps on positions 2 and 3 of operations switch S-3. Positive pedestal voltages from pedestal generator 101 are supplied through positions 2 and 3 of switch S-3A to the input of the intensity restorer 115. The restorer 115 clamps the upper edges of the positive pedestal pulses to a reference voltage level corresponding to normal intensity of the cathode-ray trace on the face of the cathode-ray tube 113. The lower edges of the pedestal pulses being negative with respect to the upper edges then bias the control-grid of the cathode-ray tube so as to blank the cathode-ray trace. Cathode-ray tube 113 is supplied with suitable beam accelerating and centering voltages not shown. The delineations appearing on the face of the cathode-ray tube 113 during operation of the receiver-indicator are as illustrated by Figs. 6a, 6b, and 6c. An explanation of the operation of the receiver-indicator to produce these delineations will appear hereinafter.

AUTOMATIC FREQUENCY CONTROL CIRCUITS

The automatic frequency control circuits 116 also referred to as automatic synchronizing circuits are similar to those described and claimed in application S. N. 74,218 filed February 2, 1949, in the name of Winslow Palmer, entitled "Synchronizer" and assigned to the same assignee as the present invention. The A. F. C. circuits 116 comprise A. F. C. delay 117, A. F. C. amplifier 118, and A. F. C. synchronizer 119. Negative pedestal pulses of waveform O or Q on lead 105 from the pedestal generator 101 are supplied to a differentiating circuit (not shown) at the input of the A. F. C. delay 117. Negative trigger pulses resulting from differentiation of the leading edges of the negative pedestal pulses initiate the A. F. C. delay 117, a mono-stable or one-shot multivibrator. The A. F. C. delay is automatically terminated approximately 100 microseconds after initiation by its own internal action as a mono-stable multivibrator. The output from the A. F. C. delay 117 is a series of recurrent negative pulses of 100 microseconds duration illustrated as waveform S of Fig. 4. These recurrent negative pulses are supplied to a differentiating circuit (not shown) at the first input of A. F. C. synchronizer 119 and also supplied over lead 127 to the automatic amplitude balancing circuits 126 of this invention. Positive trigger pulses, illustrated as waveform T Fig. 4, resulting from differentiation of the trailing edges of these negative recurrent pulses are applied to the first input of the A. F. C. synchronizer 119.

Received positive A and B pulses from receiver 12 are applied over lead 23 to the input of A. F. C. amplifier 118. Switch S-4 places the A. F. C. circuits in operation. The Loran pulses are amplified and inverted by amplifier 118 and the output Loran pulses appear as waveform U of Fig. 4. The negative output Loran pulses are supplied to a differentiating circuit (not shown) at the second input of the A. F. C. synchronizer 119 and also over lead 129 to the automatic amplitude balancing circuits 126 of this invention. The output of the A. F. C. amplifier 118 is grounded by left-right switch S-7B whose arm is coupled over lead 120 to the A. F. C. amplifier. The A. F. C. operation is thus disabled during the left or right positions of switch S-7 to insure proper operation of the left-right drift circuits.

The differentiating circuit at the second input of the A. F. C. synchronizer 119 supplies differentiated A and B pulses as illustrated by waveform V of Fig. 4 to the second input of A. F. C. synchronizer 119. The A. F. C. synchronizer 119 is a multi-grid pulse coincidence circuit producing recurrent output pulses of current whose amplitude varies according to the relative time position or coincidence between the differentiated A pulse and the particular positive trigger pulse 145 and between the differentiated B pulse and the positive trigger pulse 146. The output pulses of current from synchronizer 119 are applied to the armature 121 of polarized relay 122. The polarized relay 122 is energized by the square-wave voltage of waveform D Fig. 4 which is obtained from the relay driver 131 of the automatic gain balancing circuits 126. The armature 121 vibrates in synchronism with the square-wave voltage of waveform D and separates the output pulses from the A. F. C. synchronizer 119 varying according to the time position of the differentiated A pulses from the output pulses varying according to the time position of the differentiated B pulses. The separated output pulses from A. F. C. synchronizer 119 that are varying according to the relative time position of the differentiated A pulses with respect to the positive trigger pulses are applied over lead 123 to the long-time-constant filter 124 where they are integrated to produce a negative D.-C. control voltage. The negative D.-C. error control voltage on lead 49, illustrated as waveform W of Fig. 4, biases reactance tube 48 in order to maintain the frequency of the 100 kilocycle-per-second oscillator 26 such that the positive trigger pulses 145 into the first input of A. F. C. synchronizer 119 are locked in synchronism to the received differentiated A pulses at the second input to A. F. C. synchronizer 119. The aforesaid application S. N. 74,218 may be referred to for additional details of this A. F. C. system.

The magnitude of the negative D.-C. error control voltage on lead 49 is under the independent manual control of drift potentiometer 125 and left-right switch S-7C coupled to filter 124. The left-right switch S-7C provides two fixed negative control voltages of different magnitudes from filter 125 for biasing reactance tube 48. In the left position of switch S-7C, one of these negative control voltages causes the delineated Loran pulses to drift slowly across the face of the cathode-ray tube 113 to the left while in the right position the other voltage causes a drift of the delineated pulses to the right. These two voltages are most effective in positions 2 and 3 of operations switch S-3, the left-right switch S-7A being disconnected in these positions of switch S-3F. The drift potentiometer 125 provides an adjustable negative control voltage from filter 124 for slowly drifting the delineated A and B pulses either to the right or the left. These manual controls facilitate the alignment of the received A and B pulses atop their respective A and B pedestals as heretofore described. Basic P. R. R. switch S-8C coupled to filter 124 provides three separate time constants for the filter corresponding to the three basic pulse repetition rates identified as H, L or S.

AUTOMATIC AMPLITUDE BALANCING CIRCUITS

The automatic amplitude balance control circuits of this invention are shown as a block diagram 126 in Fig. 1 and also in circuit diagram form in Fig. 5. Referring to the block diagram 126, recurrent negative pulses illustrated as waveform S of Fig. 4 are supplied from A. F. C. delay 117 over lead 127 to a differentiating circuit (not shown) at the first input to gain synchronizer 128. The differentiating circuit produces positive pulses of approximately 5 microseconds duration, illustrated as waveform T of Fig. 4, from the trailing edges of the recurrent negative pulses of waveform S and these positive pulses energize the gain synchronizer. Negative Loran A and B pulses, illustrated as waveform U Fig. 4, are supplied from A. F. C. amplifier 118 to the second input of the gain synchronizer 128 over lead 129. The gain synchronizer 128 is a multi-grid pulse coincidence circuit producing recurrent output pulses of current whose amplitude varies according to the relative time position or coincidence between the particular 5 microsecond positive pulse 145 of waveform T and the A pulse and between the particular 5 microsecond positive pulse 146 and the B pulse. The recurrent output pulses of current, also of 5 microseconds duration, from the gain synchronizer 128 are illustrated as waveform X of Fig. 4. Since the particular positive 5 microsecond pulse 145 has been made to occur at an instant that is coincident with the cross-over of the differentiated A pulse of waveform V by action of the A. F. C. system, it occurs at the instant corresponding to the peak of the A pulse of waveform U. Accordingly, the output pulse of current from the gain synchronizer 128 due to the coincidence of the positive pulse 145 and the A pulse varies according to the peak value of the A pulse. Moreover, the amplitude of this current pulse is inversely proportional to the peak value of the A pulse.

The particular 5 microsecond positive pulse 146 is brought into coincidence with the B pulse to produce an output current pulse from the gain synchronizer by the normal operating procedure of matching the received A and B pulses on the face of the cathode-ray tube 113. The 5 microsecond pulse 146 is derived from the variably-delayed pulse of waveform S and the variably-delayed pulse of waveform S is derived from the B pedestal pulse. Therefore, the 5 microsecond positive pulse 146 is also a variably-delayed pulse. The time position of positive pulse 146 is under the control of coarse delay switch S–9 and fine delay knob 96 of the B delay circuits 60. Accordingly, the output current pulse from the gain synchronizer corresponding to the positive pulse 146 varies according to the relative time difference between positive pulse 146 and the B pulse. Moreover, the amplitude of this output current pulse is inversely proportional to the amplitude of the B pulse at the particular instant of the positive pulse 146. With the A and B pulses matched on the face of the cathode-ray tube 113, the relative time position between the positive pulse 146 and the B pulse is such that the positive pulse 146 is coincident with the peak value of the B pulse.

The output of the gain synchronizer 128 is coupled to the armature 130 of polarized relay 131. The winding of polarized relay 131 is energized by the square-wave voltage of waveform D from the relay driver 132. The relay driver 132 is a push-pull power amplifier receiving the square-wave voltage from cathode follower 53. The armature 130 of relay 131 vibrates in synchronism with the square-wave voltage of waveform D to separate into different channels the output current pulses from the gain synchronizer 128 varying according to the amplitude of the A pulses from the output current pulses varying according to the amplitude of the B pulses. The current pulses varying according to the amplitude of the A pulses are supplied to low pass filter 133 while the current pulses varying according to the amplitude of the B pulses are supplied to low pass filter 134. Filter 133 integrates its input current pulses to produce a D.-C. output control voltage of waveform Y that is inversely proportional to the amplitude of the A pulses and filter 134 integrates its input current pulses to produce a D.-C. output control voltage of waveform Z that is inversely proportional to the amplitude of the B pulses.

Switch S–8D coupled to filters 133 and 134 provides three time constants for these filters for the three basic pulse repetition rates H, L, or S and supplies anode voltage to the multi-grid pulse coincidence tube. Control box 135 includes an automatic amplitude balance control on-off switch 136, a manual gain control 137, and a manual amplitude balance control 138 and supplies appropriate control voltages to the input of cathode followers 139 and 140. With the automatic amplitude balance control on-off switch 136 in the on position, the D.-C. output control voltage from filter 133 is applied to the cathode follower 139 and the D.-C. output control voltage from filter 134 is applied to the cathode follower 140. The D.-C. output control voltages from the cathode followers 139 and 140 are applied to separate input of amplitude balance gate 141 and the D.-C. control voltage from cathode follower 139 is also applied to A. G. C. amplifier 142. The A. G. C. amplifier 142 amplifies and inverts its D.-C. input control voltage and supplies an A. G. C. voltage through cathode follower 143 to the control-grids of mixer 16 and I. F. amplifiers 18 of receiver 12. This A. G. C. voltage is illustrated as waveform AA in Fig. 4. The A. G. C. voltage adjusts the gain of receiver 12 to maintain the amplitude of the ouput A pulses of suitable constant value, as the A. G. C. voltage is directly proportional only to the peak amplitude of the A pulses. Variations in the amplitude of the B pulses have no effect on the A. G. C. voltage.

The amplitude balance gate 141 is a balanced modulator comprising a pair of multi-grid tubes receiving two pairs of input voltages. The D.-C. control voltages from the cathode followers 139 and 140 form one pair of input voltages and the push-pull square-wave voltages of waveform D from cathode follower 53 form the other pair of input voltages. The amplitude balance gate 141 produces a square-wave output voltage whose phase is determined by which of its two D.-C. input voltages from cathode followers 139 and 140 is the larger and whose peak to peak amplitude varies according to the difference between the two D.-C. input voltages. This square-wave output voltage is either in phase with one of the push-pull square-wave voltages into the amplitude balance gate or the other. This square-wave voltage is illustrated as waveform BB of Fig. 4 and is known as the automatic amplitude balance control (A. A. B. C.) voltage.

The A. A. B. C. voltage is supplied through cathode follower 144 to amplitude balance restorer 24, a diode D.-C. restorer, in receiver 12 which clamps the positive edge of the A. A. B. C. voltage to the A. G. C. voltage. As a result, the effect of the A. A. B. C. voltage is to reduce the receiver gain during negative portions of the A. A. B. C. voltage, the reduction in gain being relative to the gain control voltage. The A. G. C. voltage controls receiver gain during the reception of both A and B pulses while the A. A. B. C. voltage controls the receiver gain during the reception of only A pulses or B pulses but not both. For example, when the received B pulses are larger than the received A pulses as is the case in waveform U, the A. G. C. voltage sets the receiver gain such that the A pulses are of suitable constant amplitude as viewed on the face of the cathode-ray tube 113. The A. A. B. C. voltage reduces the receiver gain during reception of the B pulses until the amplitude of the B pulses as viewed on the face of the cathode-ray tube is substantially the same amplitude as the A pulses.

For the case where the received A pulses are larger than the received B pulses, the phase of the A. A. B. C. voltage is reversed and both the A. G. C. voltage and the A. A. B. C. voltage control the gain of the receiver during the reception of the A pulses. The gain of the receiver is reduced during the reception of the A pulses relative to the gain during reception of the B pulses and both A. G. C. and A. A. B. C. voltages set the gain such that the A pulses delineated on the face of the cathode-ray tube are of suitable constant amplitude. The B pulses are amplified more than the A pulses and the additional amount of amplification is such that the delineated A and B pulses appearing on the face of the cathode-ray tube are substantially the same amplitude. In other words, the automatic amplitude balance control action is such that the stronger Loran pulse is always reduced in amplitude without reducing the amplitude of the weaker Loran pulse.

With the automatic amplitude balance control on-off switch 136 in the off position, the D.-C. control voltages from filters 133 and 134 are shunted by the manual gain control voltage and the manual amplitude balance control voltage rendering the D.-C. control voltages from the filter ineffective. The manual gain control 137 controls receiver gain during the reception of both A and B pulses and the manual amplitude balance control 138 controls receiver gain during reception of only A pulses or B pulses but not both.

Fig. 5 discloses the circuit diagram of the automatic amplitude balance circuits of the invention. The recurrent negative pulses of waveform S from the A. F. C. delay 117 are coupled over lead 127 to the differentiating circuit comprising coupling condenser 147 and resistor 148. The pulses of 5 microseconds duration of waveform T resulting from differentiation of the negative recurrent pulses, are coupled to the control-grid 149 of the multi-grid pulse coincidence tube 150. The pulse coincidence tube 150 is normally cut off in the absence of the 5 microsecond input pulses to the control-grid 149. The cathode 151 is at a negative potential with respect to ground determined by the voltage divider comprising resistors 152 and 153 coupled between a source of negative potential and ground. The control-grid 149, however, is at a more negative potential with respect to ground than the cathode 151. The screen-grid 154 is at ground potential. During the occurrence of the 5 microsecond pulses on control-grid 149, the tube 150 conducts and pulses of electrons flow from cathode 151 to anode 155. The amount of the electron flow to the anode is determined by the potential existing on the third grid 156. The potential on this grid is normally the same as on the cathode except during the occurrence of received A and B pulses. Negative A and B pulses from the A. F. C. amplifier 118 of waveform U are coupled over lead 129 through coupling condenser 157 and resistor 158 to the potentiometer attenuator 159. Attenuated negative A and B pulses are supplied to the third grid 156 and these negative pulses reduce the pulses of electrons that flow in tube 150 when coincident with the 5 microsecond pulses on control-grid 149. The momentary reduction in the pulses of electrons varies according to the amplitude of the negative A and B pulses at the instants of the 5 microsecond pulses. The output from the anode 155 is in the form of current pulses illustrated as waveform X. These current pulses flow to armature 130 of relay 131 and either through resistor 160 to the arm of switch S-8D or through resistor 161 to the arm of switch S-8D. The positive supply voltage at the arm of switch S-8D is determined by the switch position H, L, or S and the resistor voltage dividers 162, 163, 164 and 165. Negative 5 microsecond pulses proportional to the amplitude of the current pulses of waveform X would be produced across resistors 160 and 161 if it were not for the integrating action of condensers 166 and 167 in the filters 133 and 134. This integrating action produces instead a D.-C. control voltage across these resistors 160 and 161 which varies according to the amplitude of the current pulses of waveform X. The D.-C. control voltage across resistor 160 is further smoothed by the integrating action of resistor 168 and condenser 169 in the filter 133 and the D.-C. control voltage across resistor 161 is further smoothed by the integrating action of resistor 170 and condenser 171 in the filter 134. The D.-C. control voltage of waveform Y from filter 133 is supplied to the control-grid 172 of triode 173 while the D.-C. control voltage of waveform Z from filter 134 is supplied to the control-grid 174 of tube 175.

The polarized relays 131 and 122 are energized by a square-wave voltage of waveform D from the relay driver comprising four triode tubes 176, 177, 178 and 179. Push-pull square-wave voltage from cathode follower 53 is supplied to the input of the relay driver, one phase of the push-pull voltage being capacity-coupled to the control-grids 180 and 183 of the triodes 176 and 179, respectively. The opposite or inverted phase of the push-pull voltage is capacity-coupled to the control-grids 181 and 182 of the triodes 177 and 178, respectively. Each of the four triode tubes conducts in the absence of input square-wave voltage since there is no bias voltage on the control-grids of these tubes. As a result, the common terminal 184 between the cathode 185 of the tube 176 and the anode 186 of tube 177 is at the same potential relative to ground as is the potential existing at the common terminal 187 between the cathode 188 and the anode 189. Thus, no potential exists across the serially connected windings of the polarized relays 122 and 131. Upon application of the push-pull square-wave voltage to the control-grids of the tubes, the tubes 176 and 179 conduct simultaneously during the half-cycle that the square-wave voltage on their respective control-grids is positive while at the same time the tubes 177 and 178 are non-conducting since the square-wave voltage on their control-grids is negative and these latter two tubes are cut off. The potential at the common terminal 184 is raised while the potential at the common terminal 187 is lowered and the winding of relays 122 and 131 are energized. During this condition, current flows from the common connection 184 through the serially connected windings of the relays in one direction to the common connection 187. Both of the armatures 121 and 130 are deflected so as to be positioned against one of their two contacts. During the following half-cycle of the push-pull square-wave voltage to the relay driver, the tubes 176 and 179 are non-conducting as the voltage on their respective control-grids is negative and these tubes are cut off while at the same time the tubes 177 and 178 are conducting as the voltage on their respective control-grids is positive. For this condition the potential at the common terminal 184 is lowered while the potential at the common terminal 187 is raised. Current now flows in the reverse direction from the common terminal 187 through the serially connected windings of the relays to the common terminal 184. Both of the armatures 121 and 130 are now deflected in opposite directions so as to be positioned against the other of their two contacts.

Of importance is the fact that the relay windings must be so serially connected and the push-pull square-wave input voltage applied to the relay driver be properly phased such that the armatures 121 and 130 of relays 122 and 131 switch their respective current pulses into the filters 124 and 133 during the reception of A pulses and armature 130 of relay 131 switches its current pulse into the filter 134 during the reception of B pulses.

With the automatic amplitude balance control on-off switch 136 of control box 135 in the off position, D.-C. voltages under the manual control of the manual gain potentiometer 137 and the manual amplitude balance potentiometer 138 are supplied to the control-grids 172 and 174 of the triode tubes 173 and 175, respectively. The D.-C. voltage to control-grid 172 is supplied through on-off switch 136 from the arm of potentiometer 138 while the D.-C. voltage to the control grid 174 is supplied through on-off switch 136 from the common junction between serially connected resistors 190 and 191. The serially connected resistors 190 and 191 are coupled in parallel with the potentiometer 138 forming a bridge circuit. Negative supply voltage is coupled to the lower junction terminal of the bridge circuit through resistor 192 while positive supply voltage is coupled to the upper junction terminal of the bridge circuit through resistor 193 and manual gain potentiometer 137. In this off position of switch 136 the D.-C. control voltages from the filters 133 and 134 are shunted by the D.-C. voltages from the control box 135. Because the resistance values of the potentiometers 137 and 138 and the resistors 190 and 191 are chosen lower than the resistance of the resistors 160 and 168 of filter 133 and the resistors 161 and 170 of filter 134, the D.-C. control voltages from the filters 133 and 134 are rendered ineffective. The manual amplitude balance control potentiometer 138 adjusts the D.-C. voltage on the control-grid 172 relative to the D.-C. voltage on the control-grid 174. The manual gain control potentiometer 137 raises or lowers the D.-C. voltages on control-grids 172 and 173 together while having little effect upon the difference voltage between these control-grids. A decreasing negative voltage on control-grid 172 produces an increasing negative manual gain control voltage.

With the automatic amplitude balance control on-off switch 136 in the on position, the D.-C. voltage from the control box 135 is removed from control-grid 174 while the D.-C. voltage on control-grid 172 is supplied from potentiometer 138 through resistor 194 of a high resistance value. The D.-C. control voltages from the filters 133 and 134 are now effective. The purpose of the D.-C. voltage coupled from the potentiometer 138 through the resistor 194 to control-grid 172 is to compensate for any unbalance in the tubes 173 and 174 as well as any unbalance in the tubes 201 and 202 of the amplitude balance gate.

The triodes tubes 173 and 174 operate as cathode followers and supply the output D.-C. control voltage across their respective cathode resistors 195 and 196 through resistors 197 and 198 to control-grids 199 and 200 of the multi-grid tubes 201 and 202. The common junction between cathode resistors 195 and 196 is coupled to a negative supply voltage. The output D.-C. control voltage across cathode resistor 195 is also supplied to the control-grid 203 of the triode A. G. C. amplifier tube 204. Positive screen-grid voltage is supplied to the multi-grid tubes 201 and 202 through resistor 205. Positive anode voltage is supplied to tube 201 through anode load resistor 206 and to tube 202 through anode load resistor 207. The cathodes of the tubes 201 and 202 are coupled together and to a source of negative supply voltage through resistor 208. The push-pull square-wave voltage of waveform D from cathode follower 53 is supplied to the third grids 209 and 210 of the multi-grid tubes through resistors 211 and 212. Grid resistors 213 and 214 return these grids to a source of negative voltage. The square-wave output voltage across anode load resistor 206 and across anode load resistor 207 is coupled respectively through resistors 215 and 216 to the control-grid 217 of triode cathode follower 218. The automatic amplitude balance control (A. A. B. C.) voltage across the cathode resistor 219 of tube 218 is coupled through condenser 220 to the amplitude balance restorer 24 in receiver 12. The amplitude balance gate operates in the following manner. For the condition when the D.-C. control voltage on the control-grid 199 of tube 201 is the same as the D.-C. control voltage on the control-grid 200 of the tube 202, the magnitude of the amplified square-wave voltage across anode load resistor 206 is the same as across anode load resistor 207. However, since these output square-wave voltages are exactly out of phase, the difference between them appearing at the control-grid 217 is zero. Should the D.-C. control voltage on control-grid 199 be more positive than the D.-C. control voltage on control-grid 200, then the amplification in tube 201 is larger than the amplification in tube 202 resulting in a larger square-wave voltage across anode load resistor 206 than across anode load resistor 207. The difference between these two out of phase output square-wave voltages is no longer zero and there appears at the control-grid 217 a square-wave voltage whose peak to peak amplitude is equal to the difference between the amplitudes of the two square-wave output voltages and whose phase is determined by the larger square-wave voltage from tube 201. Conversely, should the D.-C. control voltage on the control-grid 200 be positive relative to the D.-C. control voltage on the control-grid 199, then the amplification of tube 202 is the larger resulting in a larger square-wave voltage across anode load resistor 207 than across anode resistor 206. The phase of the difference square-wave voltage now appearing at the control-grid 217 is reversed, being determined by the larger square-wave voltage from tube 202. It is important that the push-pull square-wave voltage applied to the third grids 209 and 210 be properly phased such that when the received A pulses are smaller in amplitude than the received B pulses, the A. A. B. C. voltage functions to reduce receiver gain during reception of the B pulses and not during reception of the A pulses.

The D.-C. control voltage at the control-grid 203 of the A. G. C. amplifier is amplified and inverted by triode tube 204. The output voltage across anode load resistor 221 is coupled through a voltage divider comprising resistors 222 and 223 to control-grid 224 of triode cathode follower 225. The A. G. C. voltage across the cathode resistor 226 is coupled to the mixer and I. F. amplifiers of receivers 12 as previously described.

OPERATION OF IMPROVED LORAN RECEIVER-INDICATOR

Having described the improved Loran receiver-indicator of this invention, it is believed worthwhile to conclude this specification with a more detailed description of the operation of the receiver-indicator to insure a complete understanding of the invention. The receiver-indicator is used in conjunction with suitable Loran charts of the area in which navigational information is required. Referring to Figs. 6a, 6b, and 6c, three illustrations are disclosed of the delineations of the Loran A and B pulses as they appear on the face of the cathode-ray indicator 113 corresponding to the three sweep speeds provided in this equipment. The delineations, as appear in Fig. 6a, are obtained in the following manner. With the equipment placed in operating condition the channel switch S-5 is positioned so as to receive A and B pulses from the most suitable Loran master and slave stations in the area. The Loran charts are consulted in the selection of these stations. The pulse repetition rate of the chosen Loran stations is selected by the basic P. R. R. switch S-8 and the specific P. R. R. switch S-1. Test switch S-2 is set to its operations position while operations switch S-3 is set to position 1. With the automatic balance control on-off switch 136 in the off position, the amplitude of the delineated A and B pulses is adjusted to a suitable level by the manual gain control 137 and the attenuator S-6. Should interference be received along with the A and B pulses, the interference switch S-14 may be switched on. The A and B pulses appear substantially stationary on the face of the cathode-ray tube in arbitrary positions. To position the A pulse atop of the A pedestal as shown in Fig. 6a, the left-right switch S-7 is positioned to the right or left to drift the pulse appearing upon the upper trace either to the right or left so that it will ride up on top of the A pedestal. With one pulse atop the A pedestal, the second pulse should appear on the lower trace to the right of the A pedestal for correct positioning. In this case, the pulse atop the A pedestal is the A pulse and the pulse on the lower trace is the B pulse. However, should the second pulse also appear on the upper trace, then it is the B pulse which has been drifted to ride up on top of the A pedestal and the positioning of the pulses is incorrect. The left-right switch S-7 must be deflected until the pulses assume the correct position. Since the received B pulses always arrive at the receiver at times greater than one-half the pulse recurrence interval following the A pulses, the above positioning of the pulses provides a positive identification between the received A and B pulses. Should the A pulse tend to drift slowly off the top of the A pedestal, this drift can be stopped by adjusting the knob of the drift potentiometer 125. Once the A pulse has been positioned atop the A pedestal near its left-hand edge, the A. F. C. switch S-4 is switched on. Automatic synchronization of the sweep voltage in the receiver-indicator to the pulse repetition rate of the received Loran pulses is established as previously explained in connection with the A. F. C. circuits and the A pulse remains fixed atop the A pedestal. The slow sweep-speed voltage for position 1 of operations switch S-3 is illustrated as waveform N.

The B pulse on the lower trace is elevated atop the B pedestal by positioning the B pedestal to the right or left with the coarse delay switch S-9. Coarse delay switch S-9 when positioned to the right or left energizes the motor in the B delay circuits to drive the geared phase-shifting transformers in the B delay circuits so as to vary the time delay of the B pedestal relative to the A pedestal. The motor drives the gear train at high speed so as to quickly position the B pedestal. The counter 89 geared to the phase-shifting transformers revolves so as to indicate the amount of the time delay difference when the A and B pulses are correctly aligned.

Next, the operations switch S-3 is set to position 2 and the delineated A and B pulses appear as in Fig. 6B. For this position of switch S-3 it may be recalled that the sweep voltage producing the upper trace is initiated coincident with the leading edge of the A pedestal and the sweep voltage producing the lower trace is initiated coincident with the leading edge of the B pedestal. Moreover, the sweep-speed is increased as illustrated by the sweep voltage of the waveform P in order to expand the width of the delineated A and B pulses. For this condition, a change in the time delay of the B pedestal causes the delineated B pulse to be shifted to the right or left across the face of the cathode-ray tube in contrast with position 1 of operations switch S-3 above in which the B pedestal is shifted to the right or left while the B pulse remained stationary. The fine delay knob 96 is positioned now such that the B pulse on the lower trace appears directly under the A pulse on the upper trace as illustrated in Fig. 6b. The automatic amplitude balance control on-off switch 136 now may be set to its on position to automatically balance the amplitudes of the A and B pulses. Heretofore, the A and B pulses may have been different in amplitude or they may have been approximately balanced in amplitude by the manual amplitude balance control potentiometer 138. Nevertheless, with the automatic amplitude balance control on-off switch 136 in its on position and with the A and B pulses approximately matched, the amplitudes of the delineated A and B pulses hereafter will be automatically balanced to have substantially equal amplitudes.

Finally, operations switch S-3 is set to position 3 and the A and B pulses matched as shown in Fig. 6c so that their leading edges are precisely coincident. This final match requires only the adjustment of the fine delay control knob 96. As observed in Fig. 6c, the trace separation voltage obtained from cathode follower 53 has been removed thereby bringing together the traces one upon the other and the sweep speed further increased to expand the width of the delineated A and B pulses. The sweep voltage for this condition is illustrated as waveform . The time difference interval which is the Loran number is read directly from the counter 89. This number corresponds to a Loran line of position and may be located on the Loran charts. To obtain a second Loran line of position, the entire above procedure must be repeated employing Loran pulses received from a second pair of Loran stations. The intersection of the second Loran line of position with the first Loran line of position establishes a navigational fix which is the location of the Loran receiver-indicator in space.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a hyperbolic navigation receiver receptive to master pulses and slave pulses from distant transmitters wherein the strength of the received master pulses may be different from the strength of the received slave pulses; an automatic amplitude balance control system comprising, means coupled to the output of said receiver and alternately producing a first voltage version varying according to the strength of said master pulses and a second voltage version varying according to the strength of said slave pulses, means coupled to said producing means and separating said first voltage versions and said second voltage versions into different channels, means responsive to the difference between the strengths of the separated first and second voltage versions to produce a control voltage, and means adjusting the amplification of said received master pulses and said received slave pulses with said control voltage to produce output master and slave pulses of equal amplitude.

2. In a radio navigation receiver responsive to recurrent A pulses transmitted from a master station and to recurrent B pulses transmitted from a slave station, each of said recurrent B pulses arriving at the receiver at a time delayed from the arrival of each of corresponding recurrent A pulses; an automatic amplitude balance control system comprising, means coupled to the output of said receiver and alternately responsive to said recurrent A and B pulses to produce first recurrent output pulses varying according to the strength of said A pulses and second recurrent output pulses varying according to the strength of said B pulses, switching means coupled to the output of said responsive means for separating said first recurrent output pulses from said second recurrent output pulses, automatic gain control means responsive to said first recurrent output pulses and coupled to said receiver for adjusting the receiver gain to maintain the amplitude of said output A pulses of constant value, and means responsive to the difference between the amplitudes of said first and second recurrent output pulses and coupled to said receiver for controlling the gain during the time interval of reception of one of said received recurrent pulses to maintain the amplitude of said output B pulses equal to the amplitude of said output A pulses.

3. In a hyperbolic radio navigation receiver responsive to recurrent A pulses transmitted from a distant master station and to recurrent B pulses transmitted from a distant slave station, each of said recurrent B pulses arriving at the receiver at a time delayed from the arrival of each of corresponding recurrent A pulses; an automatic amplitude balance control system comprising, synchronizer means coupled to the output of said receiver and alternately producing short output pulses varying according to the amplitudes of the received A pulses and the received B pulses, switching means coupled to said synchronizer means for separating into different channels the short output pulses varying according to the amplitude of the A pulses from the short output pulses varying according to the amplitude of the B pulses, first filter means coupled to said switching means and producing a first control voltage from the short output pulses varying according to the amplitude of the A pulses, second filter means coupled to said switching means nad producing a second control voltage from the short output pulses varying according to the amplitude of the B pulses, means coupling the first control voltage from said first filter to said receiver for controlling the receiver gain to maintain the amplitude of the output A pulses of constant value, means coupled to the first and second filter means and producing a third control voltage responsive to the difference between the first and second control voltages, and means coupling the third control voltage to said receiver for controlling the receiver gain during the reception of one of said recurrent pulses to maintain the amplitude of the output A and B pulses equal in value.

4. In a hyperbolic radio navigation receiver responsive to recurrent A pulses transmitted from a distant master station and to recurrent B pulses transmitted from a distant slave station, wherein the strength of the received recurrent A pulses may be different from the strength of the received recurrent B pulses, each of said recurrent B pulses arriving at the receiver at a time delayed from the arrival of each of corresponding recurrent A pulses; an automatic amplitude balance control system comprising, a first pulse generating means producing recurrent output pulses of duration less than the duration of said recurrent A pulses, a first synchronizer means coupled to the output of said navigation receiver and synchronizing the recurrent output pulses from said first pulse generating means with said recurrent A pulses, a second pulse generating means producing recurrent output pulses of duration less than the duration of said recurrent B pulses and delayed in time relative to the recurrent pulses from said first pulse generating means, means adjusting the time delay of the recurrent output pulses from the second pulse generating means to establish coincidence with said recurrent B pulses, a second synchronizer means coupled to the output of said navigation receiver and responsive to the coincidence of the said recurrent A pulses with the recurrent output pulses from the first pulse generating means and responsive to the coincidence of the said recurrent B pulses with the recurrent output pulses from the second pulse generating means, said second synchronizer means producing recurrent output pulses varying according to the strengths of said recurrent A pulses and said recurrent B pulses, switching means coupled to the output of said second synchronizer means for separating into different channels the recurrent output pulses varying according to the strength of said recurrent A pulses from the recurrent output pulses varying according to the strength of said recurrent B pulses, first filter means coupled to said switching means and producing a first control voltage from the output pulses varying according to the strength of said A pulses, second filter means coupled to said switching means and producing a second control voltage from the output pulses varying according to the strength of said B pulses, means coupling the first control voltage from said first filter to said receiver for controlling the receiver gain to maintain the amplitude of the recurrent output A pulses of constant value, means coupled to the output of the first and second filter means and responsive to said first and second control voltages to produce a third control voltage responsive to the difference between said first and second control voltages and means coupling said third control voltage to said receiver for controlling the receiver gain during the reception of one of said received recurrent pulses to maintain the amplitude of the recurrent output A and B pulses equal in value.

5. In a radio navigation receiver alternately responsive to a first pulse received during a first time interval and to a second pulse received during a second time interval wherein the strength of the received first pulses may be different from the strength of the received second pulses, means coupled to the output of said receiver and producing a first control voltage varying according to the strength of said first pulse and producing a second control voltage varying according to the strength of said second pulse, means coupled to said producing means and responsive to said first and second control voltages for producing a third control voltage varying according to the relative strengths of said first and second control voltages, and means including a coupling for introducing said third control voltage into the navigation receiver for controlling the gain of the receiver during one of the time intervals to maintain the amplitudes of the first and second output pulses equal in value.

6. An automatic pulse amplitude balancing circuit comprising means alternately producing a first pulse during a first time interval and a second pulse during a second time interval, said means including a controllable transmission circuit transmitting said first and second pulses, means coupled to the output of said producing means and responsive to the amplitudes of said first and second output pulses for producing first and second control voltages varying according to the strengths of said first and second output pulses, means coupled to said responsive means and producing a third control voltage varying according to the relative strengths of said first and second control voltages, and means coupling said third control voltage to said producing means for varying the transmission therethrough during one of said time intervals to maintain the output first pulses equal in amplitude to the output second pulses.

7. An automatic pulse amplitude balancing circuit comprising means alternately producing a first pulse during a first time interval and a second pulse during a second time interval, said means including a controllable transmission circuit transmitting said first and second pulses, means coupled to the output of said producing means and alternately responsive to said first and second pulses for producing an output controlling voltage varying according to the relative strengths of the first and second output pulses, and means coupling said output controlling voltage to said producing means for varying the transmission therethrough during one of said time intervals such that the output first pulses are equal in amplitude to the output second pulses.

8. In a hyperbolic navigation receiver responsive to recurrent A pulses transmitted from a master station and to recurrent B pulses transmitted from a slave station, each of said recurrent B pulses arriving at the receiver at a time delayed from the arrival of each of corresponding recurrent A pulses, synchronizer means coupled to the output of said receiver and producing short output pulses varying according to the strength of the received A pulses, filter means coupled to said synchronizer means and producing a control voltage from the short output pulses varying according to the strength of the A pulses, and means coupling the control voltage to said receiver for substantially suppressing variations of the amplitude of the output A pulses.

9. In a radio navigation receiver alternately responsive to first recurrent pulses received during first time intervals and to second recurrent pulses received during second time intervals wherein the strength of the received first recurrent pulses may be different from the strength of the received second recurrent pulses, pulse generating means producing recurrent output pulses of duration less than the duration of said received first recurrent pulses, first synchronizer means synchronizing the recurrent output pulses from said pulse generating means with said received first recurrent pulses, second synchronizer means responsive to the coincidence between said received first recurrent pulses and the recurrent output pulses from said pulse generating means and producing output pulses varying according to the amplitude of said received first recurrent pulses, filter means coupled to said second synchronizer means and producing a control voltage from the output pulses varying according to the amplitude of said received first recurrent pulses, and means coupling the control voltage to said receiver for controlling the receiver gain to maintain the amplitude of said received first recurrent pulses of constant value.

WILBERT P. FRANTZ.

No references cited.